United States Patent
Hong et al.

(10) Patent No.: US 10,412,200 B2
(45) Date of Patent: Sep. 10, 2019

(54) RECONFIGURABLE EXTENDED COMMUNICATION INTERFACE DEVICES FOR MONITORING AND CONTROL OF POWER SYSTEM DEVICES

(71) Applicant: ABB Schweiz AG, Baden (CH)

(72) Inventors: Junho Hong, Cary, NC (US); Anil Kondabathini, Apex, NC (US); Dmitry Ishchenko, Cary, NC (US)

(73) Assignee: ABB Schweiz AG, Baden (CH)

( * ) Notice: Subject to any disclaimer, the term of this patent is extended or adjusted under 35 U.S.C. 154(b) by 197 days.

(21) Appl. No.: 15/783,864

(22) Filed: Oct. 13, 2017

(65) Prior Publication Data

US 2019/0116245 A1 Apr. 18, 2019

(51) Int. Cl.
*H04L 29/06* (2006.01)
*H02J 13/00* (2006.01)
*H04L 29/08* (2006.01)

(52) U.S. Cl.
CPC .......... *H04L 69/08* (2013.01); *H02J 13/0017* (2013.01); *H04L 67/125* (2013.01); *H04L 69/18* (2013.01)

(58) Field of Classification Search
CPC ....... H04L 69/08; H04L 69/18; H04L 67/125; H02J 13/0017
See application file for complete search history.

(56) References Cited

U.S. PATENT DOCUMENTS

2010/0020724 A1 1/2010 Wimmer et al.
2012/0101639 A1 4/2012 Carralero et al.
(Continued)

FOREIGN PATENT DOCUMENTS

CN 102004817 B 7/2012
KR 20150080233 A 7/2015
WO 2015126104 A1 8/2015

OTHER PUBLICATIONS

International Searching Authority, International Search Report and Written Opinion for corresponding Application No. PCT/US2018/055596, dated Dec. 31, 2018, 11 pages.

*Primary Examiner* — El Hadji M Sall
(74) *Attorney, Agent, or Firm* — J. Bruce Schelkopf; Taft Stettinius & Hollister LLP

(57) ABSTRACT

Unique systems, methods, techniques and apparatuses of a configurable extended interface device are disclosed. One exemplary embodiment is an interface device for coupling a power system device of a microgrid with a microgrid controller utilizing a data communication standard incompatible with the power system device, the interface device comprising three input ports configured to receive input from a power system device; a microgrid interface configured to provide output formatted according to any of a plurality of communication protocols, each being compatible with the data communication standard and configured to receive input defining microgrid configuration characteristics; data mapping logic structured to convert any of the input to output formatted according to any of the plurality of communication protocols; and parsing logic configured to parse the received input defining microgrid configuration characteristics effective to cause the data mapping logic to perform mapping of the received input to one of the plurality of communication protocols.

20 Claims, 3 Drawing Sheets

(56) References Cited

U.S. PATENT DOCUMENTS

| | | | |
|---|---|---|---|
| 2012/0143383 A1* | 6/2012 | Cooperrider | H04Q 9/00 |
| | | | 700/295 |
| 2012/0150361 A1* | 6/2012 | Lazaris | H02J 3/382 |
| | | | 700/297 |
| 2013/0085616 A1 | 4/2013 | Wenzel | |
| 2013/0213038 A1* | 8/2013 | Lazaris | F03G 6/00 |
| | | | 60/641.8 |
| 2014/0319911 A1* | 10/2014 | Alexander | H02J 7/35 |
| | | | 307/22 |
| 2016/0190790 A1 | 6/2016 | Oudalov et al. | |
| 2016/0197478 A1 | 7/2016 | Khaitan et al. | |
| 2016/0241039 A1* | 8/2016 | Cheng | H02J 3/383 |
| 2016/0274169 A1 | 9/2016 | Cui et al. | |
| 2017/0163029 A1 | 6/2017 | Hong et al. | |
| 2017/0229870 A1 | 8/2017 | Singh et al. | |

* cited by examiner

RECONFIGURABLE EXTENDED COMMUNICATION INTERFACE DEVICES FOR MONITORING AND CONTROL OF POWER SYSTEM DEVICES

BACKGROUND

The present disclosure relates to configurable extended communication interface devices for monitoring and control of distributed energy resources or other power system devices, and to methods and systems including or utilizing such devices. Distributed energy resources ("DERs"), such as solar, wind and combustion engine power generation apparatuses and systems, are increasingly being introduced in electrical power grids. The introduction of DERs into power grids typically involves the creation of microgrids, which are localized or localizable energy grids with control capability allowing them to disconnect from the traditional power grid and operate autonomously, semi-autonomously and/or in a coordinated fashion with. Inter-device communication in microgrid environments has created complex and challenging communication and control problems. Some efforts have been made to address these challenges such as the introduction of and use of standard-based communication protocols. Yet, many DERs and microgrid devices are not compatible with standard-based communication protocols and may also not be compatible communication protocols used by other DERs and microgrid devices. For example, DER controllers often communicate with microgrid controllers by way of different communication protocols and multiple types of communication channels. Other DERs have no ability to communicate with centralized controllers. As DERs continue to be added to the power grids and to existing microgrids, control and communication in such environments is becoming increasingly complex. There remain unmet needs including reducing DER installation complexity, simplifying data transfer in existing microgrids, and increasing power system responsiveness to faults and other grid conditions. For instance, DERs installed in a power system may not communicate with a centralized controller and thus cannot respond to faults detected by another controller. Furthermore, DERs not capable of communicating using standard based communication protocols require time-consuming configuration in order to communicate with other devices in a power system. Using multiple communication protocols to communicate within a single power system slows or prohibits data exchange and power system responsiveness to faults and other conditions within the power system. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for monitoring and controlling distributed energy resources and other power system devices using standard communication protocols are disclosed. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
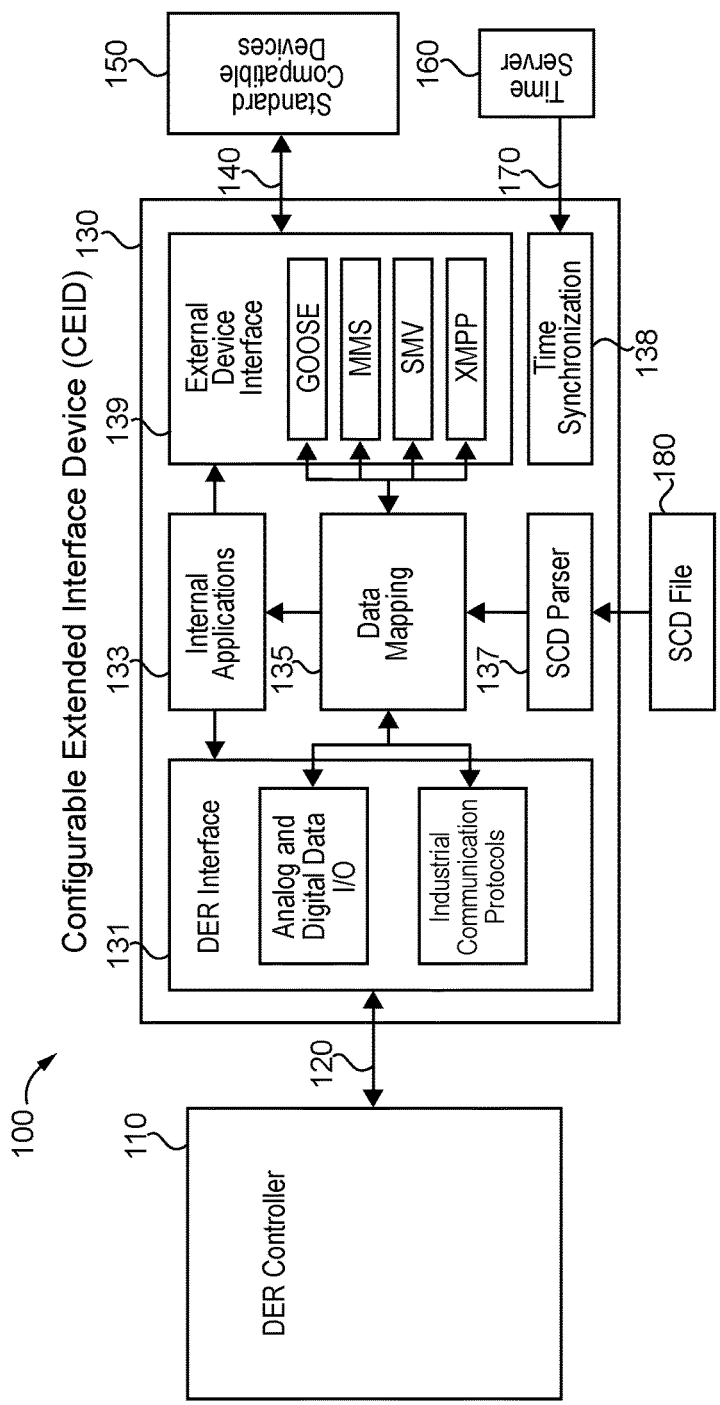
FIG. 1 is a schematic block diagram illustrating an exemplary configurable extended interface device.

With reference to FIG. 1 there is illustrated an exemplary power system 100 including an exemplary configurable extended interface device 130 coupled to a distributed energy resource (DER) controller 110. It shall be appreciated that the configurable extended interface device may be coupled to a variety of power system device controllers in a microgrid, including controllers for automatic switches, inverters, or other dumb microgrid devices, to name but a few examples. As further described herein, configurable extended interface device 130 is one example of a communication interface device which is extended in that it is able to extend the communication compatibility of devices such as a DER to which it is coupled and which is configurable in that it is able to modify or vary its compatibility and data mapping capabilities and properties in response to received information from or about the system environment in which it is implemented.

DER controller 110 is structured to control and monitor a DER. Some examples of distributed energy resources include photovoltaic energy sources, wind energy sources, energy storage systems, flywheels, and diesel generators, to name but a few examples. Controller 110 may include sensors or other types of measurement devices structured to measure electrical or physical characteristics of the DER such as output voltage, output current, or operational status.

Controller 110 includes a communication port structured to transmit and receive data. In certain embodiments, controller 110 includes an analog and digital type of input/output logic for communicating with external devices. The data transmitted between controller 110 and another power device may include device measurements and commands. For example, controller 110 may be structured to send measurements via an analog port and device status via a digital port.

In certain embodiments, controller 110 includes an industrial communications logic structured to map data to an industrial communications protocol before communicating with external devices. Controller 110 is structured to transmit and receive analog and digital data using industrial communication protocols. The data transmitted between controller 110 and another power device may include device measurements and commands. Examples of industrial communication protocols include Modbus, Distributed Network Protocol (DNP3), Fieldbus, or other vendor defined communication protocols, to name but a few examples.

DER controller 110 is structured to output data to other devices using a communication channel 120. In certain embodiments, communication channel 120 is bidirectional, allowing DER controller 110 to receive commands or data from another device. DER controller 110 may include one communication port or a plurality of communication ports to which communication channel 120 may be operatively coupled. For example, DER controller 110 may include a 16 pin serial port, a 32 pin serial port, or an Ethernet port, to name but a few examples.

Configurable extended interface device (CEID) 130 is structured to receive data from DER controller 110 by way of communication channel 120 using one of a multitude of communication protocols, map the received data to a standard communication protocol used by another device in a power system, and output the receive data to other devices in the power system. In certain embodiments, CEID 130 is structured to receive commands from another device of the power system, map the received commands to the communication protocol of communication channel 120, and output the received commands to DER controller 110.

CEID 130 includes a DER controller interface 131 operatively coupled to communication channel 120. Interface 131 may include a plurality of different types of ports such that CEID 130 may communicate with any DER controller. Interface 131 is structured to transfer data between DER controller 110 and interface 131 using any type of communication protocol, including analog or digital data I/O, industrial communication protocols, or a combination thereof.

CEID 130 includes a data mapping logic 135 structured to receive data from DER controller 110 in the form of the communication protocol used by communication channel 120. Using the received data, data mapping logic 135 maps the data with to standard based data structure. Data mapping logic 135 may also receive data from another power device and map the received data to the communication protocol used by DER controller 110. The standard data structure may include a plurality of common data types, including boolean, integer (int8, int16, int32, int64, enum), unsigned integer (int8u, int16u, int32u, dbpos, quality), floating point (float32, float64), or raw character byte (visible string, unicoded string, octet string, timestamp). Data received by data mapping logic 135 which does not conform to the standard data structure is mapped to the common data types of the standard data structure.

In certain embodiments, the data mapping logic 135 is structured to abstract the definition of data items by creating data objects and services independent of communication protocols. The abstracted data models define a standardized data structure for describing a power system that enables all controllers of the power system to exchange data using identical protocols. The abstracted definitions allow mapping of the data objects and services from one communication protocol to another. For example, data mapping logic 135 may map data using a data model including a plurality of logical nodes, each logical node being a grouping of data and associated services related to a power function. Within each logical node is one or more data objects conforming to a common data class. Mapping includes transforming the model information into an object defined by a communication protocol. In certain embodiments, data mapping logic 135 uses abstraction and mapping techniques compatible with the IEC 61850 standard.

Standard based peer to peer communication can enable the fast data exchange between DER controllers, management systems, and protective IEDS in the system. This enables operator to reduce response times to grid conditions such as unplanned islanding or internal faults.

Using semantics based standard information models simplifies integration of different DER controllers from different vendors and provides standard means for aggregating microgrid resource capabilities and generation/load balance at the point of microgrid interconnect. In this way, multiple microgrids may be combined into a larger distribution system where a microgrid is represented as a single controllable entity. Additional grid services may be performed by DER controllers with new communication capabilities of the configurable extended interface devices, such as ancillary frequency regulation or Volt/VAR control.

The microgrid interface of CEID 130 includes a substation configuration description (SCD) parser 132 structured to transmit data about the power system to data mapping logic 135. An SCD storage device 180 is structured to transfer an SCD file to SCD parser 137 by way of a wired or wireless communication channel. SCD storage device 180 may transfer the SCD file to parser 137 by way of a dedicated port or by way of external device interface 139. A SCD file is a computer file in XML format created according to standard based schema. The SCD file may include a single line diagram, as well as communication network and IED information. Parser 137 parses the SCD file and retrieves information regarding external devices with which to exchange information, including the single line diagram, communication network information, external device information, logical device information, logical node information, data object information, data attribute information, component information, GOOSE control block information, and MMS control block information. Information from the SCD file is allocate to each function of data mapping logic 135. For example, parser 137 retrieves information regarding the GOOSE control block, allocates data in the data mapping logic 135, and maps date received from DER controller to a GOOSE communication protocol used by external device interface 139. DER controller 110 may be configured with predefined setting values and functions based on the SCD file. For example, parser 137 uses the SCD file to determine a circuit breaker status dataset should be received from another power device within the same microgrid. The SCD file is updated when the microgrid is restructured or the communication network is altered. In certain embodiments, the communication network model and single line diagram data can be provided in a common information model (CIM) format.

CEID 130 includes a microgrid interface including an external device interface 139 structured to communicate with an external device 150 using one of a set of standard communication protocols. CEID 130 is operatively coupled to an external device 150 by way of a communication channel 240. In certain embodiments, CEID 130 is operatively coupled to a plurality of external devices by way of a plurality of communication channels.

In certain embodiments, the set of standard communication protocols use a standard information model generated using data abstraction and a configuration language. Using the set of standard communication protocols allow for real-time communication with self-description. It is important to note industrial protocols lack these features. For example, standard communication protocols such as GOOSE and SMV use a layer 2 communication data link which allows for real-time communication, as opposed to DNP3 or Modbus which require TCP/IP.

In certain embodiments, one standard communication protocol is structured to transfer time stamped state information between data objects of the data model. In certain embodiments, one standard communication protocol is structured to transmit real-time data in an XML format. In certain embodiments, one standard communication protocol is structured to transfer time stamped sample measured values.

External device 150 is a power system device configured to communicate with other power system devices using a standard communication protocol. In certain embodiments, external device 150 is a distributed energy resource management system (DERMS), a distribution management system (DMS), a relay, another CEID, a microgrid controller, or any other microgrid device configured to communicate in a standard communication protocol.

In certain embodiments, interface 139 is structured to communicate with external device 150 using communication protocols defined by IEC 61850, such as IEC 61850-7-420 and IEC 61850-90-7. These communication protocols include generic object-oriented substation event (GOOSE), manufacturing message specification (MMS), sampled measured values (SMV), and Extensible Messaging and Presence Protocol (XMPP).

In the illustrated embodiment, CEID 130 includes an internal applications logic 133 structured to execute algorithms using data received by CEID 130 from DER controller 110 or external device 150. For example, logic 133 may receive circuit breaker statuses for all breakers within a zone of a microgrid from an Information Communication and Technology network, and determine whether the microgrid is operating in grid connected mode or islanded mode. In another example, internal applications logic 133 may receive multiple sampled measurement value streams from several external devices in a microgrid and determine issues with sensors, detect data spoofing, or detect a cyber-attack. In still another example, logic 133 may receive sampled values from an AC grid connection point and calculate both non-directional and direction overcurrent protections for backup protection. Logic 133 could also calculate a fault indicator of the microgrid or determine desired fault ride through characteristics, such as the characteristics defined by IEEE 1547-2017.

Analysis generated by logic 133 may be available for other devices of the power system. For example, calculated fault indicators may be sent to a microgrid controller for fault cause determination, fault location and microgrid restoration processes.

The microgrid interface of CEID 130 includes a time synchronization logic 138 structured to communicate with an external timing device 160 by way of a communication channel 170. Logic 138 receives time data according to a standard protocol, such as pulse per second (PPS), Simple Network Time Protocol (SNTP), or IEEE 1588, to name but a few examples. Logic 138 receives the time data and synchronizes all data in CEID 130. For example, using time data, CEID 130 may determine whether incoming data from external device 150 is expired. External timing device 160 may be a GPS receiver that supports time protocols such as PPS, SNTP and IEEE 1588, to name but a few examples. It shall be appreciated that any or all of the foregoing features of CEID 130 may also be present in the other configurable extended interface devices disclosed herein, such as the CEIDs of microgrid 200 in FIG. 2 and CEID 430 of FIG. 4.

Figure 2:
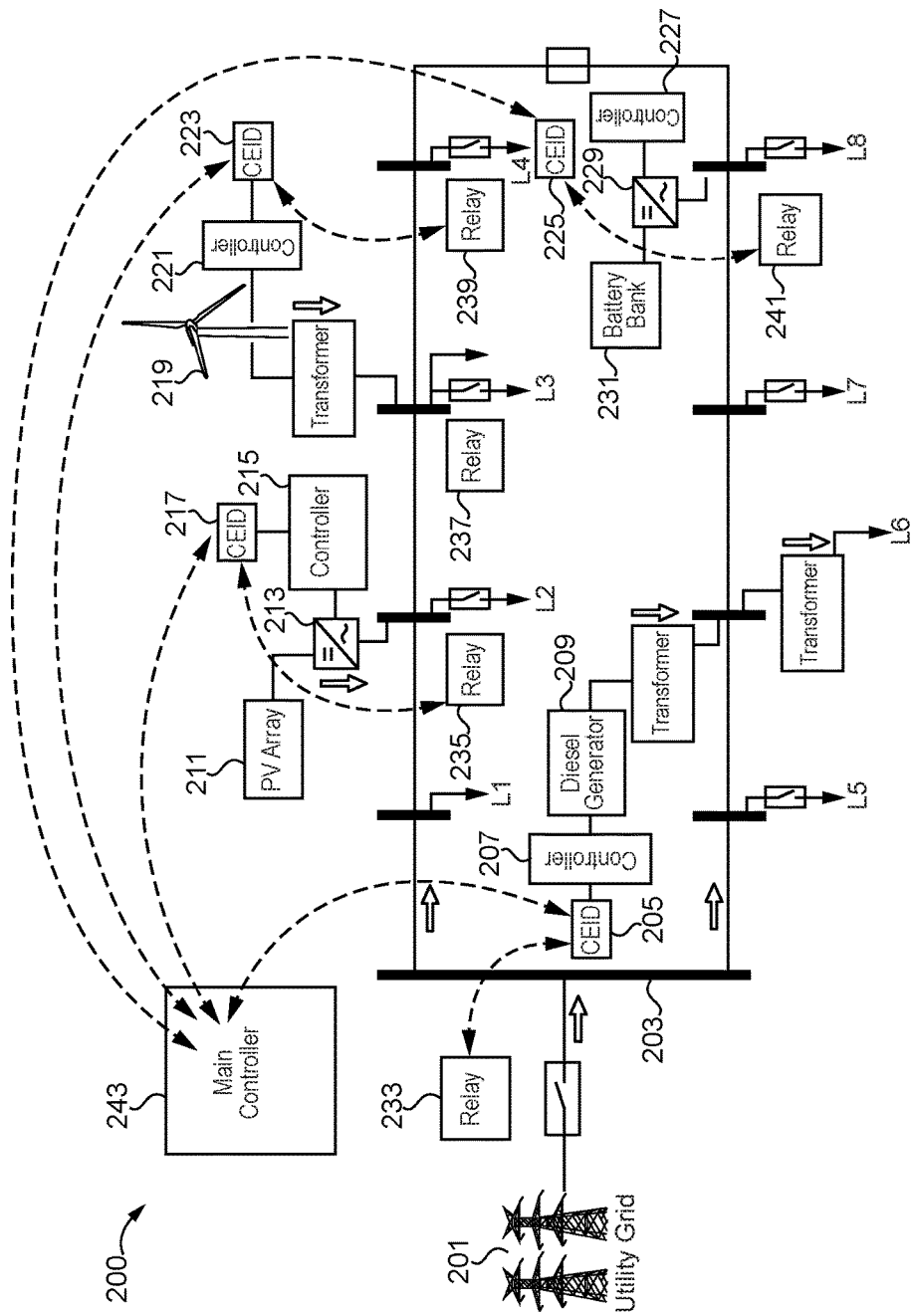
FIG. 2 illustrates an exemplary microgrid including the configurable extended interface device of FIG. 1.

With reference to FIG. 2 there is illustrated an exemplary microgrid 200 including exemplary configurable extended interface devices 217, 223, 203, and 223. It shall be appreciated that the topology of microgrid 200 is illustrated for the purpose of explanation and is not intended as a limitation of the present disclosure. For example, other microgrids may include a distributed microgrid control system including multiple microgrid controllers. Although microgrid 200 is illustrated with a single line diagram, microgrid 200 may be structured to transmit single phase or multiphase power.

Microgrid 200 is operatively coupled to a utility grid 201 and is structured to transmit power between microgrid 200 and utility grid 201. Microgrid 200 includes a distribution network 203 coupled to a plurality of loads L1-L8. Microgrid 200 also includes relays 233, 235, 237, 239, and 241, each relay being structured to allow or disrupt the flow of electric current through a portion of distribution network 203. Microgrid 200 also includes a plurality of DERs and DER controllers coupled to distribution network 203 and structured to provide power to the loads L1-L8 of microgrid 204 and utility grid 201.

Each DER controller of microgrid 200 is coupled with a configurable extended interface device. Without the configurable extended interface device, significant effort is required to add a DER to a microgrid controls system. For instance, a microgrid operator may add a PV array with only Modbus communication protocol capabilities. In order to connect the new DER to existing DERMs or DMS, operators need to configure the Modbus communication protocol, including configuring an analog and digital points list and associating the measured or controlled quantities with the specific point in the list. The DMS or DERMS will need to poll for data at a specified polling rate. For example, the DMS or DERMs will poll for data every 5 seconds.

With configurable extended interface devices that support plug and play functions, DERs can connect with existing DERMS or DMS after setting up the internal mapping of the CEID. Each DER may be added to a semantically based model without the need for separate configuration for each DER. A semantic based model includes a plurality of objects in a model hierarchy, each object being specifically defined in the standard. Additionally, client-server model is supported by the standard based communication protocol, where data is reported whenever a changes occurs in a monitored quantity, eliminating the need to polling.

DER 209 is a diesel generator controlled by DER controller 207. A configurable extended interface device 205 is coupled to DER controller 207. Configurable extended interface device 205 is in communication with relay 233 and a microgrid controller 243. When a DER controller becomes able to communicate through standard based communication protocols using the configurable extended interface device, a system operator no longer needs to separately configure a communication channel between the DER controller and each power system device. By comparison, a microgrid may use a legacy protocol, such as Modbus or DNP3, to allow communication between two devices. The registers for analog measurements and control status differ for devices produced by different product groups require separate configuration in order for each DER controller to communicate with another device, such as microgrid controller 243.

DER 211 is a photovoltaic array and is coupled to a power converter 213 which is controlled by DER controller 215. A configurable extended interface device 217 is operatively coupled to DER controller 215. Configurable extended interface device 217 is in communication with relay 235 and microgrid controller 243.

DER 219 is a wind turbine controlled by DER controller 221. A configurable extended interface device 223 is coupled to controller 221. Configurable extended interface device 223 is in communication with relay 239 and microgrid controller 243.

DER 231 is and energy storage system and is coupled to power converter 229. Power converter 229 is controlled by DER controller 227. A configurable extended interface device 225 is operatively coupled to controller 227. Configurable extended interface device 225 is in communication with relay 241 and microgrid controller 243.

Microgrid controller 243 is structured to use the standard based plug-and-play functionality, automatically detecting and monitoring DER controllers by communicating with the configurable extended interface devices. Microgrid controller 243 is also structured to monitor, analyze, and control the DERs of microgrid 200 using the configurable extended interface devices. In certain embodiments, microgrid controller 243 transmits commands to DER controllers through CEIDs so as to program schedules for DER production over a time horizon.

DERs can advertise to controller 243 in an object model what capabilities they are able to provide in terms of power, energy, and ancillary services as well as operating conditions such as ramp rate and price. DERs may also use the standard based communication to request services, such as charging, based on grid state as published by system operator via CIM services. Using formal XML based description for DER asset capabilities provides a means for abstracting physical characteristics and specific details of a microgrid node, and expresses entity self-descriptions in a modeling language suitable for formal analysis and verification.

Implementing the configurable extended interface devices allows a system operator to have more control over microgrid 200 while reducing configuration time. For example, updating a standard based communication protocol in a microgrid with the configurable extended interface devices merely requires updating the communication stack of each configurable extended interface device.

Figure 3:
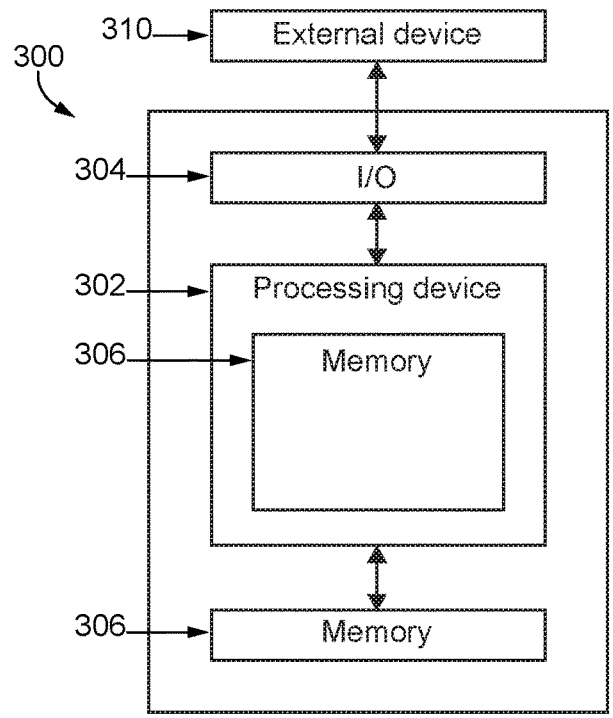
FIG. 3 is a schematic block diagram of an exemplary computing device.

With reference to FIG. 3, there is illustrated a schematic block diagram of a computing device 300. Computing device 300 is one example of a DER controller or configurable extended interface device, which is used, in different embodiments, in connection with an exemplary power system, such as power system 100 shown in FIG. 1. Computing device 300 includes a processing device 302, an input/output device 304, and a memory device 306. Computing device 300 may be a stand-alone device, an embedded system, or a plurality of devices structured to perform the functions described with respect to power system 100. Furthermore, computing device 300 communicates with one or more external devices 310.

Input/output device 304 enables the computing device 300 to communicate with external device 310. For example, input/output device 304 in different embodiments may be a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. Input/output device 304 is comprised of hardware, software, and/or firmware. It is contemplated that input/output device 304 includes more than one of these adapters, credentials, or ports, such as a first port for receiving data and a second port for transmitting data.

External device 310 in different embodiments is any type of device that allows data to be input or output from computing device 300. For example, external device 310 in different embodiments is a power system device, a mobile device, a reader device, equipment, a handheld computer, a diagnostic tool, a controller, a computer, a server, a printer, a display, an alarm, a visual indicator, a keyboard, a mouse, or a touch screen display. Furthermore, it is contemplated that external device 310 is be integrated into computing device 300. It is further contemplated that more than one external device is in communication with computing device 300.

Processing device 302 in different embodiments is a programmable type, a dedicated, hardwired state machine, or a combination of these. Device 302 can further include multiple processors, Arithmetic-Logic Units (ALUs), Central Processing Units (CPUs), Digital Signal Processors (DSPs), Field-programmable Gate Array (FPGA), to name but a few examples. For forms of processing device 302 with multiple processing units, distributed, pipelined, or parallel processing can be used as appropriate. Processing device 302 may be dedicated to performance of just the operations described herein or may be utilized in one or more additional applications. In the illustrated form, processing device 302 is of a programmable variety that executes processes and processes data in accordance with programming instructions (such as software or firmware) stored in memory device 306. Alternatively, or additionally, programming instructions are at least partially defined by hardwired logic or other hardware. Processing device 302 can be comprised of one or more components of any type suitable to process the signals received from input/output device 304 or elsewhere, and provide desired output signals. Such components may include digital circuitry, analog circuitry, or a combination of both.

Memory device 306 in different embodiments is of one or more types, such as a solid-state variety, electromagnetic variety, optical variety, or a combination of these forms, to name but a few examples. Furthermore, memory device 306 can be volatile, nonvolatile, transitory, non-transitory or a combination of these types, and some or all of memory device 306 can be of a portable variety, such as a disk, tape, memory stick, cartridge, to name but a few examples. In addition, memory device 306 can store data or operating logic that is manipulated by processing device 302, such as data representative of signals received from or sent to input/output device 304 in addition to or in lieu of storing programming instructions, just to name one example. As shown in FIG. 3, memory device 306 may be included with processing device 302 or coupled to processing device 302, but need not be included with both.

Figure 4:
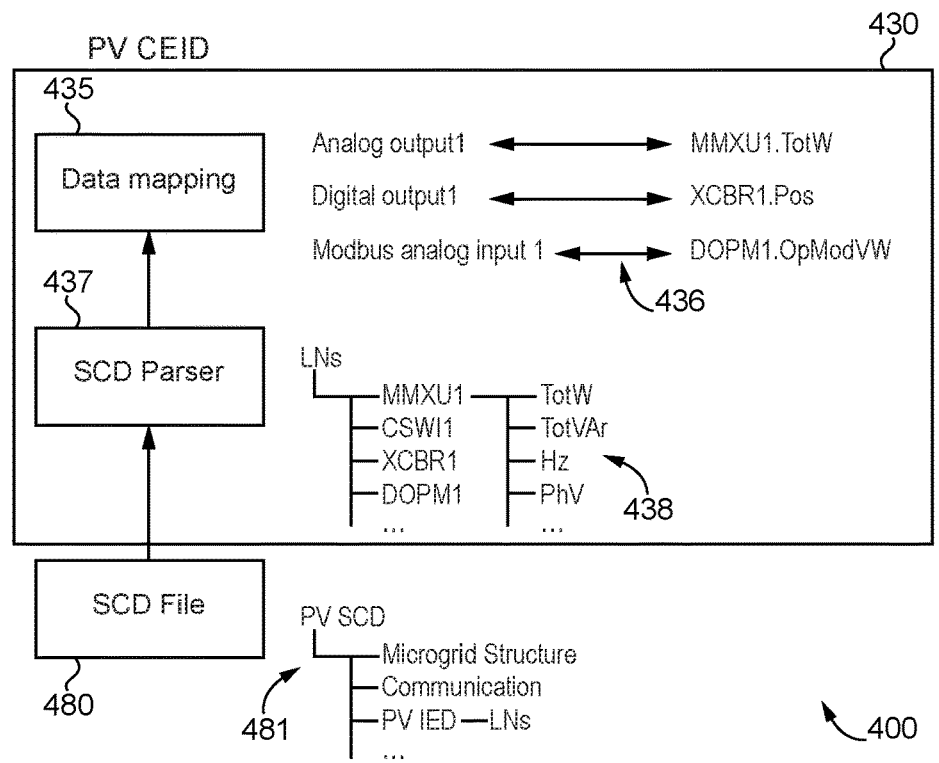
FIG. 4 illustrates a portion of the exemplary configurable extended interface device in FIG. 1.

With reference to FIG. 4 there is illustrated a portion of an exemplary CEID 430 coupled to an inverter controller of a photovoltaic energy source, such as CEID 130 of FIG. 1. CEID 430 includes a data mapping logic 435 and an SCD parser 437. CEID is structured to receive data from an SCD file 480.

SCD file 480 includes data structure 481 structured to organize information including a microgrid single line diagram (Microgrid Structure), communication information (Communication), and inverter component information. SCD parser 437 is structured to subscribe to SCD file 480 and extract necessary information. For example, CEID 430 needs measurements, switch statuses, and operation modes. Therefore, parser 437 extracts logical nodes MMXU1, CSWI1, XCBR1, and DOPM1 from SCD file 480. Each logical node is associated with data objects. For example, MMXU1 is associated with TotW, TotVAr, Hz, and PhV. Data mapping logic 435 receives the extracted data models including the logical nodes and data objects, and maps the extracted data model to the data received from a DER controller, such as DER controller 110. As indicated by data mapping sets 436, Analog output1 from the DER controller, such as active power measurements, is mapped to data object MMXU1.TotW, Digital output1, such as inverter switch statuses, from the DER controller is mapped to data object XCBR1.Pos, and Modbus analog input1, such as an operation mode, is mapped to data object DOPM1.OpModVW.

Further written description of a number of exemplary embodiments shall now be provided. One embodiment is an interface device for operatively coupling a power system device of a microgrid with a microgrid controller utilizing a data communication standard otherwise incompatible with the power system controller, the interface device comprising a plurality of ports configured to receive input from a power system device including a first port configured to receive input in a power system device-native analog format, a second port configured to receive input in a power system device-native digital format, and a third port configured to receive input formatted according to a first communication protocol; a microgrid interface configured to provide output formatted according to any of a plurality of communication protocols, each of the plurality of communication protocols being different from the first communication protocol and each plurality of communication protocols being compatible with the data communication standard, and configured to receive input defining microgrid configuration characteristics; data mapping logic operatively coupled with the plurality of ports, operatively coupled with the microgrid interface, and structured to convert any of the input in the power system device-native analog format, the input in the power system device-native digital format, and the input according to the first predetermined communication protocol to output formatted according to any of the plurality of communication protocols; and parsing logic configured to parse the received input defining microgrid configuration characteristics effective to cause the data mapping logic to perform mapping of a selected one of the input in the power system device-native analog format, the input in the power system device-native digital format, and the input according to the first predetermined communication protocol to one of the plurality of communication protocols.

In certain forms of the foregoing device, the device comprises an internal applications logic structured to receive data from an external microgrid device using the fourth port, generate a command using the received data, and transmit the command to the power system device using the plurality of ports. In certain forms, the microgrid interface includes a fourth port configured to receive input defining a microgrid configuration characteristic update and the parsing logic is configured to parse the received input defining microgrid configuration characteristic update effective to cause the data mapping logic to update mapping the selected one of the input in the power system device-native analog format, the input in the power system device-native digital format, and the input according to the first predetermined communication protocol to one of the plurality of communication protocols. In certain forms, the data mapping logic includes a data model including a plurality of nodes and data objects corresponding to a plurality of external devices and a plurality of pre-defined functions. In certain forms, the plurality of communication protocols being compatible with the data communication standard include IEC 61850 protocols. In certain forms, the received input defining microgrid configuration characteristics includes an XML, file identifying a plurality of power system devices of the microgrid and commands to transmit data received with the plurality of ports to a portion of the plurality of power system devices using the fourth port. In certain forms, the power system device includes a distributed energy resource (DER) and a DER controller structured to communicate with the interface device by way of the plurality of ports. In certain forms, the device is structured to receive a command from a microgrid controller and transmit the command to the DER controller using the data mapping logic.

Another exemplary embodiment is a method for operatively coupling a power system device of a microgrid with a microgrid controller utilizing a data communication standard otherwise incompatible with the power system device, the method comprising receiving, with one of a plurality of ports of a configurable extended interface device, input data from a power system device structured to output according to one of a power system device-native analog format, a power system device-native digital format, and a first communication protocol; converting, with a digital mapping logic of the configurable extended interface device, any of the input in the power system device-native analog format, the input in the power system device-native digital format, and the input according to the first predetermined communication protocol to output formatted according to any of the plurality of communication protocols, each of the plurality of communication protocols being different from the first communication protocol and each plurality of communication protocols being compatible with the data communication standard; transmitting, with a microgrid interface of the configurable extended interface device, an output formatted according to one of the plurality of communication protocols; receiving, with the microgrid interface of the configurable extended interface device, input defining microgrid configuration characteristics; and parsing the received input defining microgrid configuration characteristics effective to cause the data mapping logic to perform mapping of a selected one of the input in the power system device-native analog format, the input in the power system device-native digital format, and the input according to the first predetermined communication protocol to one of the plurality of communication protocols.

In certain forms of the foregoing method, the method comprises receiving input defining a microgrid configuration characteristic update; parsing the received input defining microgrid configuration characteristic update effective to cause the data mapping logic to update mapping the selected one of the input in the power system device-native analog format, the input in the power system device-native digital format, and the input according to the first predetermined communication protocol to one of the plurality of communication protocols. In certain forms, the plurality of communication protocols being compatible with the data communication standard include IEC 61850 protocols. In certain forms, the power system device is a distributed energy resource controller. In certain forms, the data mapping logic performs mapping of the selected one of the input by generating an information model using information received from an SCD file. In certain forms, the method comprises receiving input from an external device according to one of the plurality of communication protocols; and mapping the input from the external device received according to one of the plurality of communication protocols to the power system device-native analog format, the power system device-native digital format, or the first predetermined communication protocol.

A further exemplary embodiment is a microgrid system comprising a power system device; a power system device controller structured to measure electrical characteristics of the power system device; a microgrid control system utilizing a data communication standard incompatible with the power system device controller; and an interface device for operatively coupling the power system device and the microgrid control system, the interface device comprising a plurality of ports configured to receive input from a power system device including a first port configured to receive input in a power system device-native analog format, a second port configured to receive input in a power system device-native digital format, and a third port configured to receive input formatted according to a first communication protocol, a microgrid interface configured to provide output formatted according to any of a plurality of communication protocols, each of the plurality of communication protocols being different from the first communication protocol and each plurality of communication protocols being compatible with the data communication standard, and configured to receive input defining microgrid configuration characteristics, data mapping logic operatively coupled with the plurality of ports, operatively coupled with the microgrid interface, and structured to convert any of the input in the power system device-native analog format, the input in the power system device-native digital format, and the input according to the first predetermined communication protocol to output formatted according to any of the plurality of communication protocols, and parsing logic configured to parse the received input defining microgrid configuration characteristics effective to cause the data mapping logic to perform mapping of a selected one of the input in the power system device-native analog format, the input in the power system device-native digital format, and the input according to the first predetermined communication protocol to one of the plurality of communication protocols.

In certain forms of the foregoing system, the data communication standard is IEC 61850 protocol. In certain forms, the data communication standard is one of generic object-oriented substation event (GOOSE), manufacturing message specification (MMS), sampled measured values (SMV), and Extensible Messaging and Presence Protocol (XMPP). In certain forms, the power system device is one of a photovoltaic energy source, a diesel generator, an energy storage device, and a wind energy source. In certain forms, the parsing logic receives input defining microgrid configuration characteristics in the form of an SCD file, and wherein the input defining microgrid configuration characteristics includes a single line diagram and communication network information. In certain forms, the data mapping logic is structured to generate an information model using the input defining microgrid configuration characteristics.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. An interface device for operatively coupling a power system device of a microgrid with a microgrid controller utilizing a data communication standard otherwise incompatible with the power system controller, the interface device comprising:
   a plurality of ports configured to receive input from a power system device including a first port configured to receive input in a power system device-native analog format, a second port configured to receive input in a power system device-native digital format, and a third port configured to receive input formatted according to a first communication protocol;
   a microgrid interface configured to provide output formatted according to any of a plurality of communication protocols, each of the plurality of communication protocols being different from the first communication protocol and each plurality of communication protocols being compatible with the data communication standard, and configured to receive input defining microgrid configuration characteristics;
   data mapping logic operatively coupled with the plurality of ports, operatively coupled with the microgrid interface, and structured to convert any of the input in the power system device-native analog format, the input in the power system device-native digital format, and the input according to the first predetermined communication protocol to output formatted according to any of the plurality of communication protocols; and
   parsing logic configured to parse the received input defining microgrid configuration characteristics effective to cause the data mapping logic to perform mapping of a selected one of the input in the power system device-native analog format, the input in the power system device-native digital format, and the input according to the first predetermined communication protocol to one of the plurality of communication protocols.

2. The device of claim 1 comprising an internal applications logic structured to receive data from an external microgrid device using the fourth port, generate a command using the received data, and transmit the command to the power system device using the plurality of ports.

3. The device of claim 1 wherein the microgrid interface includes a fourth port configured to receive input defining a microgrid configuration characteristic update and the parsing logic is configured to parse the received input defining microgrid configuration characteristic update effective to cause the data mapping logic to update mapping the selected one of the input in the power system device-native analog format, the input in the power system device-native digital format, and the input according to the first predetermined communication protocol to one of the plurality of communication protocols.

4. The device of claim 1 wherein the data mapping logic includes a data model including a plurality of nodes and data objects corresponding to a plurality of external devices and a plurality of pre-defined functions.

5. The device of claim 1 wherein the plurality of communication protocols being compatible with the data communication standard include IEC 61850 protocols.

6. The device of claim 1 wherein the received input defining microgrid configuration characteristics includes an XML file identifying a plurality of power system devices of the microgrid and commands to transmit data received with the plurality of ports to a portion of the plurality of power system devices using the fourth port.

7. The device of claim 1 wherein the power system device includes a distributed energy resource (DER) and a DER controller structured to communicate with the interface device by way of the plurality of ports.

8. The device of claim 7 wherein the device is structured to receive a command from a microgrid controller and transmit the command to the DER controller using the data mapping logic.

9. A method for operatively coupling a power system device of a microgrid with a microgrid controller utilizing a data communication standard otherwise incompatible with the power system device, the method comprising:
   receiving, with one of a plurality of ports of a configurable extended interface device, input data from a power system device structured to output according to one of a power system device-native analog format, a power system device-native digital format, and a first communication protocol;
   converting, with a digital mapping logic of the configurable extended interface device, any of the input in the power system device-native analog format, the input in the power system device-native digital format, and the input according to the first predetermined communication protocol to output formatted according to any of the plurality of communication protocols, each of the plurality of communication protocols being different from the first communication protocol and each plurality of communication protocols being compatible with the data communication standard;
   transmitting, with a microgrid interface of the configurable extended interface device, an output formatted according to one of the plurality of communication protocols;
   receiving, with the microgrid interface of the configurable extended interface device, input defining microgrid configuration characteristics; and
   parsing the received input defining microgrid configuration characteristics effective to cause the data mapping logic to perform mapping of a selected one of the input in the power system device-native analog format, the input in the power system device-native digital format, and the input according to the first predetermined communication protocol to one of the plurality of communication protocols.

10. The method of claim 9 comprising receiving input defining a microgrid configuration characteristic update; parsing the received input defining microgrid configuration characteristic update effective to cause the data mapping logic to update mapping the selected one of the input in the power system device-native analog format, the input in the power system device-native digital format, and the input according to the first predetermined communication protocol to one of the plurality of communication protocols.

11. The method of claim 9 wherein the plurality of communication protocols being compatible with the data communication standard include IEC 61850 protocols.

12. The method of claim 9 wherein the power system device is a distributed energy resource controller.

13. The method of claim 9 wherein the data mapping logic performs mapping of the selected one of the input by generating an information model using information received from an SCD file.

14. The method of claim 9 comprising:
   receiving input from an external device according to one of the plurality of communication protocols; and
   mapping the input from the external device received according to one of the plurality of communication protocols to the power system device-native analog format, the power system device-native digital format, or the first predetermined communication protocol.

15. A microgrid system comprising:
   a power system device;
   a power system device controller structured to measure electrical characteristics of the power system device;
   a microgrid control system utilizing a data communication standard incompatible with the power system device controller; and
   an interface device for operatively coupling the power system device and the microgrid control system, the interface device comprising:
      a plurality of ports configured to receive input from a power system device including a first port configured to receive input in a power system device-native analog format, a second port configured to receive input in a power system device-native digital format, and a third port configured to receive input formatted according to a first communication protocol,
      a microgrid interface configured to provide output formatted according to any of a plurality of communication protocols, each of the plurality of communication protocols being different from the first communication protocol and each plurality of communication protocols being compatible with the data communication standard, and configured to receive input defining microgrid configuration characteristics,
      data mapping logic operatively coupled with the plurality of ports, operatively coupled with the microgrid interface, and structured to convert any of the input in the power system device-native analog format, the input in the power system device-native digital format, and the input according to the first predetermined communication protocol to output formatted according to any of the plurality of communication protocols, and
      parsing logic configured to parse the received input defining microgrid configuration characteristics effective to cause the data mapping logic to perform mapping of a selected one of the input in the power system device-native analog format, the input in the power system device-native digital format, and the input according to the first predetermined communication protocol to one of the plurality of communication protocols.

16. The system of claim 15 wherein the data communication standard is IEC 61850 protocol.

17. The system of claim 15, where the data communication standard is one of generic object-oriented substation event (GOOSE), manufacturing message specification (MMS), sampled measured values (SMV), and Extensible Messaging and Presence Protocol (XMPP).

18. The system of claim 15, wherein the power system device is one of a photovoltaic energy source, a diesel generator, an energy storage device, and a wind energy source.

19. The system of claim 15 wherein the parsing logic receives input defining microgrid configuration characteristics in the form of an SCD file, and wherein the input defining microgrid configuration characteristics includes a single line diagram and communication network information.

20. The system of claim 19 wherein the data mapping logic is structured to generate an information model using the input defining microgrid configuration characteristics.

* * * * *